United States Patent [19]

Mukae et al.

[11] Patent Number: 4,553,894

[45] Date of Patent: Nov. 19, 1985

[54] METHOD OF AND APPARATUS FOR TRANSFERRING ANNULAR ARTICLES FROM ONE STAGE TO ANOTHER

[75] Inventors: Makito Mukae; Tsuginori Oshima, both of Higashimurayama, Japan

[73] Assignee: Bridgestone Tire Company Ltd., Tokyo, Japan

[21] Appl. No.: 563,639

[22] Filed: Dec. 20, 1983

[30] Foreign Application Priority Data

Dec. 23, 1982 [JP] Japan .................. 57-231115

[51] Int. Cl.⁴ ............................................. B65G 1/06
[52] U.S. Cl. .................................. 414/331; 156/403; 414/225; 414/281; 414/286; 414/744 C; 414/786; 414/908
[58] Field of Search ............... 414/222, 225, 226, 266, 414/277, 281, 331, 342, 347, 348, 908, 911, 27, 330, 416, 744 C, 751, 786; 156/403, 422, 131, 132; 425/DIG. 33; 29/744

[56] References Cited

U.S. PATENT DOCUMENTS 3,982,989  9/1976  Badenkov et al. .................. 156/403
3,999,665 12/1976  Rogers .......................... 414/911 X
4,204,903  5/1980  Alexander ...................... 414/222 X
4,264,387  4/1981  Allitt ............................ 156/403 X
4,306,826 12/1981  Detwiler ........................ 414/391 X

FOREIGN PATENT DOCUMENTS 7558  1/1977  Japan .................................. 414/908

Primary Examiner—Robert J. Spar
Assistant Examiner—Stuart J. Millman
Attorney, Agent, or Firm—Cushman, Darby & Cushman

[57] ABSTRACT

A method of and an apparatus for transferring annular articles from one stage to another, each article having a ferromagnetic element, comprising hanging the annular articles from a hanger bar having spacer elements arranged at spacings from each other, the articles suspended from the hanger bar being axially spaced apart in parallel from each other across the spacer elements and having center axes aligned with each other in a predetermined direction, and transferring the articles from the hanger bar to a subsequent stage by repeating the steps comprising transferring one of the articles from the hanger bar to a carrier member constructed of permanent magnet, the article transferred to the carrier member being attached to the carrier member with the ferromagnetic element attracted to the permanent magnet, moving the article transferred to the carrier member upwardly with respect to the hanger bar so that the article is disengaged from the two adjacent spacer elements, moving the carrier member away from the hanger bar in the predetermined direction so that the article disengaged from the spacer elements is withdrawn from the hanger bar, and transferring the annular article from the carrier member to the subsequent stage.

7 Claims, 3 Drawing Figures

METHOD OF AND APPARATUS FOR TRANSFERRING ANNULAR ARTICLES FROM ONE STAGE TO ANOTHER

FIELD OF THE INVENTION

The present invention relates to a method of and an apparatus for transferring annular articles from one stage to another. A typical example of an annular article to be handled in a method and an apparatus according to the present invention is a filler-fitted bead core with a bundle of bead wires wrapped in a layer of unvulcanized rubber. Thus, the present invention relates more particularly to a method of and a bead transfer apparatus for transferring filler-fitted bead cores from one stage to another.

BACKGROUND OF THE INVENTION

During manufacture of pneumatic tires, it is required to supply filler-fitted bead cores each constructed of unvulcanized rubber with a bundle of bead wires wrapped therein and a rubber filler fitted to the outer peripheral surface of the bead core. Such filler-fitted bead cores being subject to deformation, difficulties have been encountered in fitting the bead cores on a tire building machine by the use of automated mechanical means. For this reason, filler-fitted bead cores have thus far been installed on a tire building machine solely by human efforts.

While bead cores are being handled manually, the fillers fitted to the bead cores tend to stick to one another. If a filler thus caused to stick another one is forced to separate forcibly therefrom, the filler may be caused to deform irregularly and may lose its initial configuration. Meticulous care must therefore be exercised in manually handling filler-fitted bead cores, imposing mental and physical burdens on operators to fit filler-fitted bead cores on a tire building machine. Manual handling of bead cores has further been a bar to drastically improving the production efficiency of tires. The present invention aims at resolution of these problems encountered in a prior-art method of supplying filler-fitted bead cores to a tire building machine.

SUMMARY OF THE INVENTION

In accordance with one outstanding aspect of the present invention, there is provided a method of transferring annular articles from one stage to another, each of the annular articles having a ferromagnetic component element, comprising hanging the annular articles from a hanger bar having a plurality of spacer elements arranged in an array at predetermined spacings from each other, the individual annular articles suspended from the hanger bar being axially spaced apart substantially in parallel from each other respectively across the spacer elements and having respective center axes substantially aligned with each other in a predetermined direction, and transferring the annular articles from the hanger bar to a subsequent stage by repeating the steps comprising a first step of transferring one of the annular articles from the hanger bar to a magnetic article carrier member at least partly constructed of permanent magnet, the annular article transferred to the article carrier member being attached to the article carrier member with the ferromagnetic component element magnetically attracted to the aforesaid permanent magnet, a second step of moving the annular article transferred to the article carrier member upwardly with respect to the hanger bar so that the particular annular article is disengaged from the two spacer elements adjacent the annular article, a third step of moving the article carrier member away from the hanger bar in the predetermined direction so that the annular article disengaged from the spacer elements is withdrawn from the hanger bar, and a fourth step of transferring the annular article from the article carrier member to the subsequent stage. The magnetic article carrier member is preferably held in a first predetermined position in which the annular article transferred thereto from the hanger bar is held in a position having its center axis substantially in parallel with the predetermined direction. In this instance, the aforesaid steps for transferring the annular articles from the hanger bar to the above mentioned subsequent stage further comprises a fifth step of turning the article carrier member from the first predetermined position to a second predetermined position through a predetermined angle about an axis substantially parallel with the predetermined direction and thereafter the annular article is transferred from the article carrier member to the subsequent stage. The steps for transferring the annular articles from the hanger bar to the subsequent stage may further comprise a sixth step of transferring from the article carrier member to a retainer plate having carried thereon a plurality of slide members radially movable on the retainer plate toward and away from a predetermined axis substantially parallel with the predetermined direction, the sixth step comprising (a) moving the article carrier member so that the annular article carried thereon coaxially surrounds the slide members, (b) moving the slide members away from the predetermined axis until the slide members are brought into pressing contact at their radially outer ends with the inner peripheral surface of the annular article, and (c) moving the retainer plate away from the article carrier member so that the annular article is transferred from the article carrier member to the retainer plate whereupon the annular article is transferred from the retainer plate to the subsequent stage.

In accordance with another outstanding aspect of the present invention, there is provided an article transfer apparatus for transferring annular articles from one stage to another, each of the annular articles having a ferromagnetic component element, comprising at least one article carrier assembly comprising (a) at least one hanger bar operable for having a plurality of filler-fitted annular articles suspended therefrom, and (b) a plurality of spacer elements arranged in an array at predetermined spacings from each other, the annular articles suspended from the hanger bar being axially spaced apart substantially in parallel from each other respectively across the spacer elements and having respective center axes substantially aligned with each other in a predetermined direction of the apparatus, and an article transfer assembly comprising (c) a magnetic article carrier member at least partly constructed of permanent magnet and operable for having each of the annular articles transferred from the hanger bar and attached to the article carrier member with the ferromagnetic component element magnetically attracted to the permanent magnet, (d) support means for supporting the magnetic article carrier member, the support means being vertically movable with respect to the hanger bar, (e) first drive means operative to drive the article transfer assembly for movement in the predetermined direction of the apparatus for causing the article carrier member to contact one of the annular articles, and (f) second drive means operative to drive the support means for upward movement with respect to the hanger bar for permitting each of the annular articles to be disengaged from each of the spacer elements, the first drive means being further operative to drive the article transfer assembly for movement in the predetermined direction for causing the annular article contacted by the article carrier member and disengaged from the spacer elements to withdraw from the hanger bar to the article carrier member.

BRIEF DESCRIPTION OF THE DRAWINGS

The features and advantages of a method and a bead transfer apparatus according to the present invention will be more clearly appreciated from the following description taken in conjunction with the accompanying drawings in which.

DETAILED DESCRIPTION OF THE INVENTION

Although the gist of the present invention is applicable to the handling of annular articles of any nature, the present invention will be hereinafter described in detail as being applied to the handling of filler-fitted bead cores each form part of a pneumatic tire by way of example.

Figure 1:
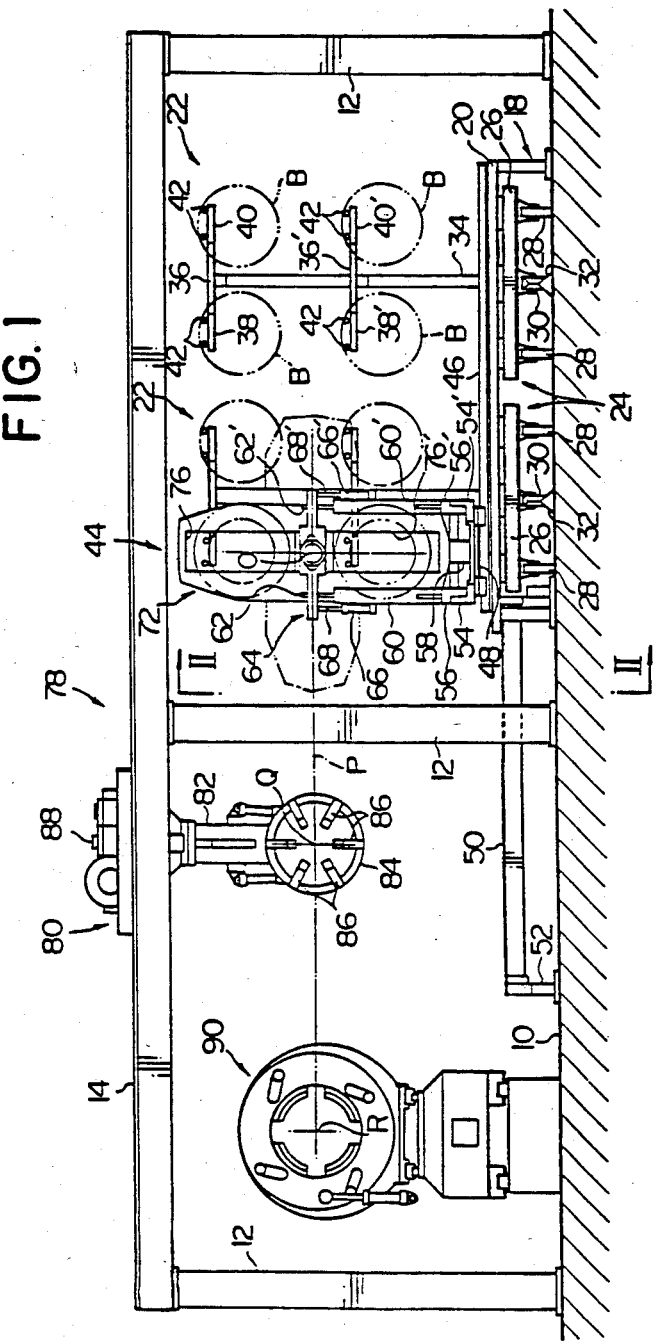
FIG. 1 is a front elevation view showing a preferred embodiment of a bead transfer apparatus according to the present invention.
Figure 2:
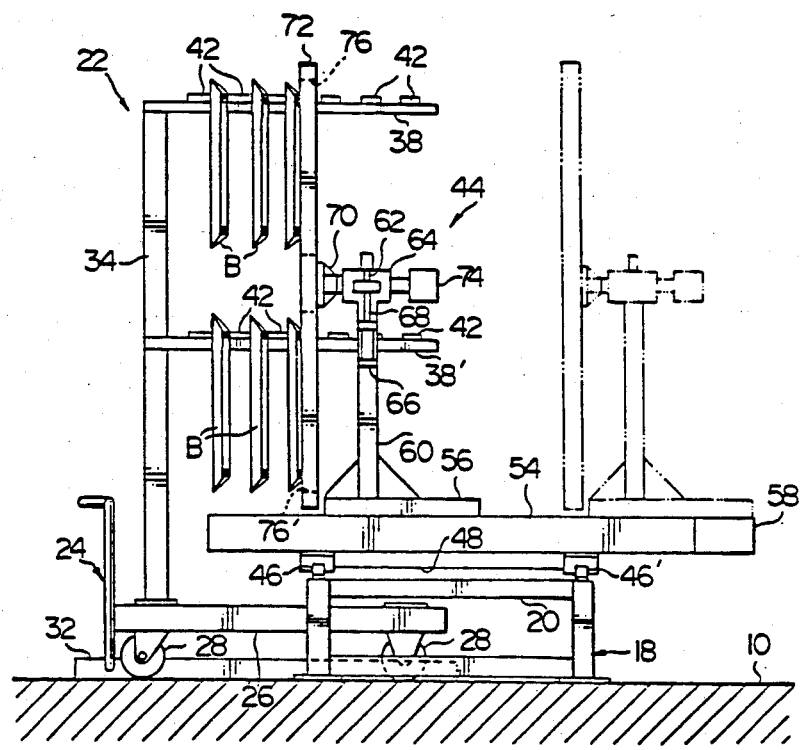
FIG. 2 is a side elevation view showing a bead hanger assembly and a bead transfer assembly which form part of the bead transfer apparatus embodying the present invention, the bead carrier and transfer assemblies being viewed from a vertical plane indicated by line II—II in FIG. 1.
Figure 3:
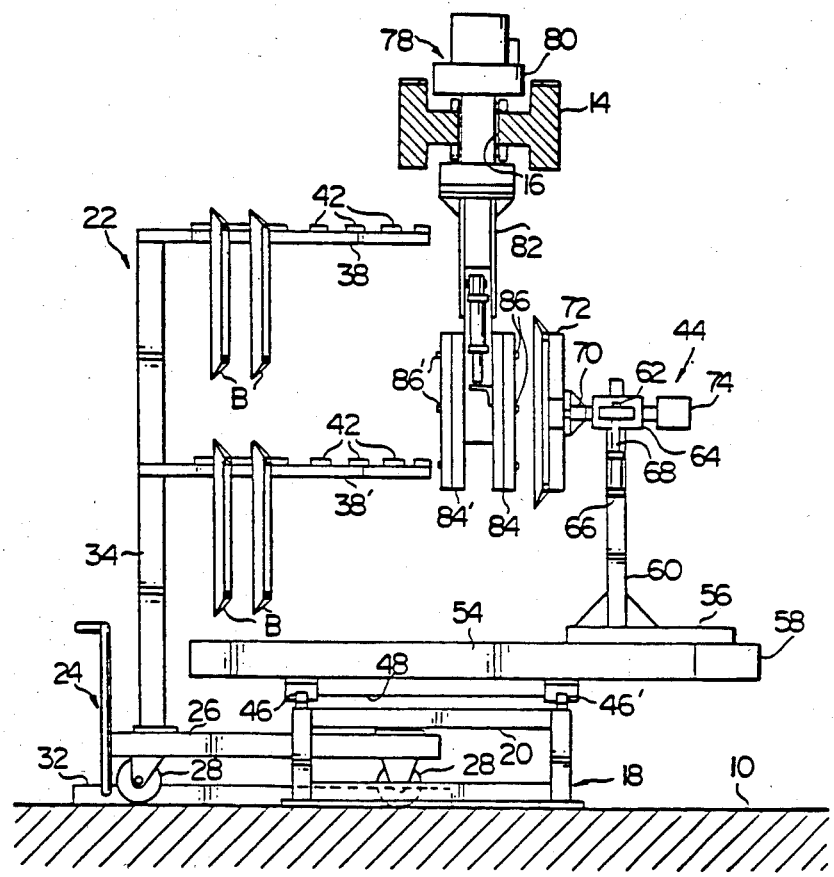
FIG. 3 is a view similar to FIG. 2 but shows not only the bead carrier and transfer assemblies but a bead retainer assembly forming part of the bead transfer apparatus according to the present invention.

Referring concurrently to FIGS. 1, 2 and 3 of the drawings, a bead transfer apparatus embodying the present invention is installed on a horizontal floor surface 10. Upstanding from the floor surface 10 are a suitable number of vertical support columns 12 which are horizontally spaced apart at suitable distances from each other in a longitudinal direction of the apparatus. The support columns 12 thus arranged on the floor surface 10 carry at their upper ends a single overhead beam 14 horizontally extending in the longitudinal direction of the apparatus. As shown in FIG. 3, the overhead beam 14 is formed with a guide slot 16 longitudinally extending along the beam 14 from the vicinity of one end of the beam 14 to the vicinity of the other end of the beam 14. The support column or columns 12 which are located intermediate between the columns 12 located below the opposite ends of the overhead beam 14 may be slightly offset from the beam 14 in a lateral direction of the apparatus for the reason which will become apparent as the description proceeds. On the floor surface 10 is further fixedly mounted a support base structure 18 positioned below the overhead beam 14. The support base structure 18 is composed of a plurality of posts upstanding from the floor surface and a horizontal upper wall 20 which is mounted on the posts and which is elongated in a longitudinal direction of the apparatus.

The bead transfer apparatus embodying the present invention further comprises a suitable number of hanger assemblies 22 which are arranged in a longitudinal direction of the apparatus and each of which is in its entirety movable on the floor surface 10 with respect to the support base structure 18. Each of the hanger assemblies 22, which are shown in FIG. 1 as being two in number by way of example, comprises a wheeled conveyor 24 having a horizontal base 26 and a suitable number of wheels 28 which are rollable on the floor surface 10. The wheeled conveyor 24 of each of the hanger assemblies 22 further has at least one guide wheel 30 formed with a circumferential groove along the outer perimeter thereof. The guide wheel 30 is rollable on a guide rail 32 fixedly laid on the floor surface 10 and longitudinally extending partly below the upper wall 20 of the support base structure 18 in a lateral direction of the apparatus. The wheeled conveyor 24 of each of the hanger assemblies 22 is thus movable along a predetermined path in the lateral direction of the apparatus to and from a predetermined operative position having the base 26 projecting into the space between the floor surface 10 and the upper wall 20 of the support base structure 18 as shown in FIG. 1. The wheeled conveyor 24 of each hanger assembly 22 has mounted thereon a vertical support post 34 upstanding from the base 26 of the wheeled conveyor 24. The support post 34 in turn supports parallel upper and lower support arms 36 and 36' each horizontally elongated in a longitudinal direction of the apparatus. The upper support arm 36 has its intermediate portion secured to an upper end portion of the support post 34 and the lower support arm 36' has its intermediate portion secured to an intermediate portion of the post 34. The upper support arm 36 has a pair of hanger bars 38 and 40 extending from the opposite ends, respectively, of the support arm 36 and horizontally spaced apart in parallel from each other in a longitudinal direction of the apparatus. Similarly, the lower support arm 36' has a pair of hanger bars 38' and 40' longitudinally extending from the opposite ends, respectively, of the support arm 36' and horizontally spaced apart in parallel from each other in a longitudinal direction of the apparatus. The upper hanger bars 38 and 40 and lower hanger bars 38' and 40' are located at predetermined heights from the floor surface 10, the height of the upper hanger bars 38 and 40 being less than the height of the overhead beam 14 from the floor surface 10 as will be seen from FIG. 1, each hanger bar having a predetermined width in a longitudinal direction of the apparatus. Each of the hanger bars 38, 38', 40 and 40' thus supported by the support post 34 on the wheeled conveyor 24 is provided with a number of lugs or spacer elements 42 which are arranged in two parallel arrays on the upper face of each carrier arm. The two arrays of the spacer elements 42 on each of the hanger bars 38, 38', 40 and 40' are horizontally spaced apart in parallel from each other in a longitudinal direction of the apparatus and are elongated each in a lateral direction of the apparatus and, furthermore, the individual spacer elements 42 in each of the arrays are horizontally spaced apart equidistantly from each other in a lateral direction of the apparatus as will be gathered from the illustrations of FIGS. 1, 2 and 3. The distance between the spacer elements 42 adjacent each other in a lateral direction of the apparatus is approximately equal to or slightly larger than the width of a filler-fitted bead core B to be used. The hanger bars 38, 38', 40 and 40' and the spacer elements 42 being thus arranged above each of the wheeled conveyors 24, a plurality of filler-fitted bead cores B can be suspended from each of the hanger bars in such a manner that each of the bead cores B has its upper arcuate portion interposed between a pair of spacer elements 42 adjacent to each other in a longitudinal direction of the apparatus and an adjacent pair of spacer elements 42 adjacent to each other in a longitudinal direction of the apparatus. The filler-fitted bead cores B thus suspended from each hanger bar form a generally tubular array having a center axis in a direction in which each hanger bar is elongated, viz., in a lateral direction of the apparatus as will be seen from FIG. 1.

The bead transfer apparatus embodying the present invention further comprises a bead transfer assembly 44 to which the filler-fitted bead cores B carried on the hanger assembly 22 as above described are to be transferred. The bead transfer assembly 44 as a whole is movable in a longitudinal direction of the apparatus on and along a pair of guide rails 46 and 46' fixedly mounted on the upper wall 20 of the above described support base structure 18. The guide rails 46 and 46' extend each in a longitudinal direction of the apparatus and are horizontally spaced apart from each other in a lateral direction of the apparatus. A horizontal base member 48 is slidable on these guide rails 46 and 46' and is driven for movement along the guide rails 46 and 46' in a longitudinal direction of the apparatus by suitable drive means. In the embodiment herein shown, such drive means is constituted by a fluid-operated power cylinder 50 extending in a longitudinal direction of the apparatus and having a cylinder body secured to the floor surface 10 by means of a bracket member 52 as shown in FIG. 1 and a piston rod connected at its leading end to the slidable base member 48 by suitable fastening means (not shown). The power cylinder 50 is provided with suitable brake means, though not shown in the drawings. The slidable base member 48 has fixedly supported thereon a pair of guide rails 54 and 54' extending each in a lateral direction of the apparatus and horizontally spaced apart from each other in a longitudinal direction of the apparatus. The guide rails 46 and 46', slidable base member 48 and power cylinder 50 which are arranged as above described constitute, in combination, first drive and guide means for the bead transfer assembly 44 in the bead transfer apparatus embodying the present invention and are adapted to drive the bead transfer assembly 44 for movement in a longitudinal direction of the apparatus.

Now, the bead transfer assembly 44 of the bead transfer apparatus embodying the present invention comprises a pair of slider plates 56 and 56' which are slidable on the guide rails 54 and 54', respectively, and which are driven for movement along the guide rails 46 and 46' in lateral directions of the apparatus by suitable drive means. In the embodiment herein shown, such drive means is constituted by a fluid-operated power cylinder 58 of, for example, the rodless type and is fixedly mounted on the slidable base member 48 by suitable fastening means (not shown). The guide rails 54 and 54' and power cylinder 58 constitute in combination second drive and guide means for the bead transfer assembly 44 in the bead transfer apparatus embodying the present invention and are adapted to drive the bead transfer assembly 44 for movement in a lateral direction of the apparatus. The slider plates 56 and 56' have fixedly supported thereon support posts 60 and 60' upstanding from the upper face of the slider plates 56 and 56', respectively, and horizontally spaced apart in parallel from each other in a longitudinal direction of the apparatus. Guide rods 62 and 62' project upwardly from these support posts 60 and 60', respectively, and have jointly supported thereon a support structure 64 having a middle portion and a pair of wing portions extending in opposite directions in a longitudinal direction of the apparatus. The support structure 64 is movable a predetermined distance along the guide rods 62 and 62' upwardly from and downwardly above the slidable base member 48. The support structure 64 is driven for such upward and downward movement by suitable drive means associated therewith. In the embodiment herein shown, such drive means comprises two fluid-operated power cylinders 66 and 66'. The power cylinders 66 and 66' have cylinder bodies secured to the support posts 60 and 60', respectively, and piston rods 68 and 68' axially extending upwardly from the cylinder bodies and connected at their upper ends to the wing portions of the support structure 64 as shown. A shaft 70 extends through the middle portion of the support structure 64 in a lateral direction of the apparatus and is secured at its leading end to a middle portion of an elongated bead carrier plate 72 which is constructed of a permanent magnet. The bead carrier plate 72 thus coupled to the support structure 64 is vertically movable therewith between predetermined first and second or upper and lower limit positions above the slidable base member 48. The above mentioned power cylinders 66 and 66' are adapted to hold the bead carrier plate 72 in the lower limit position thereof with the piston rods 68 and 68' downwardly retracted and in the upper limit position thereof with the piston rods 68 and 68' extended upwardly. The shaft 70 thus carrying the magnetic bead carrier plate 72 is connected to suitable rotary drive means such as, for example, a fluid-operated rotary actuator unit 74. The magnetic bead carrier plate 72 is thus rotatable about an axis O aligned with the center axis of the shaft 70 with respect to the support posts 60 and 60'. When the support structure 64 is held in the above mentioned predetermined lower limit position above the slidable base member 48 as above described, the axis of rotation O of the support structure 64 is located on a horizontal plane P at a predetermined height from the floor surface 10. The rotary actuator unit 74 is adapted to drive the bead carrier plate 72 to turn through 90 degrees between a vertically elongated, first predetermined or upright position (indicated by full lines in FIG. 1) and a horizontally elongated, second predetermined or sidelong position (indicated by phantom lines in FIG. 1) about the center axis of the shaft 70. The magnetic bead carrier plate 72 is formed with two generally rectangular, vertically elongated upper and lower slots 76 and 76' which are separate from each other across the above mentioned middle portion of the bead carrier plate 72. Each of these upper and lower slots 76 and 76' is sized to accommodate passage of each of the previously mentioned hanger bars 38, 38', 40 and 40' of the hanger assembly 22 therethrough in a lateral direction of the apparatus or, more particularly, has a width larger than the width of each of the hanger bars 38, 38', 40 and 40'. Thus, each of the upper hanger bars 38 and 40 is allowed to pass horizontally through the upper slot 76 in the bead carrier plate 72 in a lateral direction of the apparatus and, likewise, each of the lower hanger bars 38' and 40' is allowed to pass horizontally through the upper slot 76' in the bead carrier plate 72 in a lateral direction of the apparatus, as will be described in more detail. The power cylinder 50 associated with the bead transfer assembly 44 and the power cylinders 58, 66 and 66' and rotary actuator unit 74 of the bead transfer assembly 44 are operated by control signals supplied from a suitable control unit (not shown).

The filler-fitted bead cores B transferred from the hanger assembly 22 to the bead transfer assembly 44 constructed and arranged as above described are further transferred to a bead retainer assembly 78. As shown in FIG. 1, the bead retainer assembly 78 comprises a drive and guide unit 80 mounted on the previously described overhead beam 14 and movable along the overhead beam 14 through the elongated slot 16 (FIG. 3) in the beam 14. A hanger column 82 depends from the drive and guide unit 80 and has secured thereto two disc-shaped, first and second bead retainer plates 84 and 84' (FIG. 3) having aligned respective center axes Q, the first retainer plate 84 being assumed to be the one seen in FIG. 1 and the second retainer plate 84' being assumed to be positioned at the back of the first retainer plate 84. The first and second retainer plates 84 and 84' have carried on the outer faces thereof radial slide members 86 and 86' located symmetrically about the aligned center axes Q of the retainer plate 84 and 84', respectively, and radially slidable toward and away from the center axes of the plate 84 and 84'. The radial slide members 86 and 86' thus mounted on the retainer plates 84 and 84', respectively, are associated with suitable drive means adapted to drive the slide members between predetermined radially innermost and outermost positions of the retainer plates 84 and 84'. When the slide members on each of the retainer plates 84 and 84' are moved to the radially outermost positions on the retainer plate, a circle with a predetermined diameter is described about the center axis Q of the retainer plate by the respective outer ends of the individual slide members. The predetermined diameter of the circle thus defined by the slide members on each of the retainer plates 84 and 84' is slightly larger than the inside diameter of the filler-fitted bead cores B to be used on the bead transfer apparatus embodying the present invention. The hanger column 82 and the retainer plates 84 and 84' thus arranged with the radial slide members 86 and 86' are pivotally movable about a vertical axis through 180 degrees between opposite positions having the first and second retainer plates 84 and 84' facing laterally of the apparatus. The hanger column 82 and the retainer plates 84 and 84' are thus operatively connected to suitable rotary motion drive means such as a fluid-actuated rotary actuator 88 forming part of the drive and guide unit 80 and are driven to turn between these two opposite positions. The rotary actuator 88 and the drive means associated with the radial slide members 86 and 86' on the retainer plates 84 and 84' are also operated by control signals to be supplied from the previously mentioned control unit. The aligned center axes Q of the retainer plates 84 and 84' are located on the horizontal plane P on which the axis of rotation O of the support structure 64 of the bead transfer assembly 44 is located when the support structure 64 is held in the predetermined lower limit position thereof above the floor surface 10. The bead retainer assembly 78 is initially held in a predetermined rest position opposite to the hanger assemblies 22 across the bead transfer assembly 44 in a longitudinal direction of the apparatus as shown in FIG. 1. Further positioned opposite to the hanger assemblies 22 across the bead transfer assembly 44 and bead retainer assembly 78 is a bead setter assembly 90 which is installed on the floor surface 10 and which has a center axis R fixed with respect to the overhead beam 14. The bead setter assembly 90 is adapted to receive the bead cores B from the bead retainer assembly 78 and to transfer the bead cores B to a tire building unit (not shown).

Description will now be made in regard to the operation of the bead transfer apparatus embodying the present invention thus constructed and arranged as hereinbefore described. Prior to the start of the operation, the wheeled conveyor 24 forming part of each of the hanger assemblies 22 is maintained in an inoperative position moved away, in a lateral direction of the apparatus, from the predetermined operative position thereof so that the base 26 of the wheeled conveyor 24 is located out of the space between the floor surface 10 and the upper wall 20 of the support base structure 18. On the other hand, the bead transfer assembly 44 as a whole is, together with the slidable base member 48, positioned adjacent one of the hanger assemblies 22 in a longitudinal direction of the apparatus and is maintained, in a lateral direction of the apparatus, in a predetermined initial position adjacent the ends of the guide rails 54 and 54' remote from the particular hanger assembly 22 as indicated by phantom lines in FIG. 2. Furthermore, the power cylinders 66 and 66' associated with the magnetic bead carrier plate 72 are held in conditions having the piston rods 68 and 68' retracted downwardly so that the bead carrier plate 72 is maintained in the previously mentioned predetermined lower limit position above the slidable base member 48 carrying the bead transfer assembly 44 as shown in FIG. 1. The bead retainer assembly 78 is held in the predetermined initial rest position between the bead transfer assembly 44 and the bead setter assembly 90 in a longitudinal direction of the apparatus as shown in FIG. 1 and is assumed to be held in a condition having the first retainer plate 84 on that side of the bead retainer assembly 78 which is ready to receive a bead core B. The radial slide members 86 and 86' on the retainer plates 84 and 84' are held in the predetermined radially innermost positions on the retainer plates 84 and 84'.

Before the apparatus is put into operation, filler-fitted bead cores B are manually mounted on the hanger assembly 22. For this purpose, the filler-fitted bead cores B are hung on each of the hanger bars 38, 38', 40 and 40' on each of the wheeled conveyors 24 in such a manner that each bead core B has its upper arcuate end portion interposed between a pair of spacer elements 42 adjacent to each other in a longitudinal direction of the apparatus and an adjacent pair of spacer elements 42 adjacent to each other in a lateral direction of the apparatus as will be seen from FIG. 2. The filler-fitted bead cores B are thus axially spaced apart in parallel from each other and have respective center axes aligned with each other in a direction in which each hanger bar is elongated. The filler-fitted bead cores B suspended from each hanger bar in this fashion form a generally tubular array having a center axis in a lateral direction of the apparatus as will be seen from FIG. 1. Each of the wheeled conveyors 24 having the filler-fitted bead cores B carried on the hanger bars 38, 38', 40 and 40' is then driven, either by human effort or by suitable drive means (not shown) to the predetermined operative position thereof as shown in FIG. 2. The bead transfer assembly 44 being held in the predetermined initial position above the slidable base member 48, the upper and lower slots 76 and 76' in the upright bead carrier plate 72 of the bead transfer assembly 44 are respectively aligned, in a lateral direction of the apparatus, with those upper and lower hanger bars 38 and 38' of the particular hanger assembly 22 which are located close to the bead retainer assembly 78 so that the filler-fitted bead cores B suspended from these hanger bars 38 and 38' are positioned above the slidable base member 48 carrying the bead transfer assembly 44 as will be best seen from FIG. 1. The power cylinder 58 of the bead transfer assembly 44 is then actuated to drive the bead transfer assembly 44 as a whole for movement on and along the guide rails 54 and 54' from the predetermined initial position above the slidable base member 48 toward the hanger bars 38 and 38' of the hanger assembly 22. As the magnetic bead carrier plate 72 of the bead transfer assembly 44 is moved toward the support post 34 of the hanger assembly 22, the hanger bars 38 and 38' pass through the upper and lower slots 76 and 76', respectively, in the bead carrier plate 72 so that those filler-fitted bead cores B which are located closest to the free ends of the hanger bars 38 and 38' are endwise brought into contact with the outer faces of upper and lower half portions, respectively, of the bead carrier plate 72. The bead cores B thus attached to the magnetic bead carrier plate 72 are retained on the bead carrier plate 72 with the bead wires in the bead cores B magnetically attracted to the bead carrier plate 72. As the bead transfer assembly 44 is further driven to move toward the vertical support post 34 of the hanger assembly 22 after the two filler-fitted bead cores B are thus attached and retained to the magnetic bead carrier plate 72, the bead cores B on the bead carrier plate 72 are forced against the end faces of those spacer elements 42 on the hanger bars 38 and 38' which are located adjacent the bead cores B on the bead carrier plate 72. The wheeled conveyor 24 being locked in a lateral direction of the apparatus, the bead transfer assembly 44 is prohibited from being further moved forwardly in a lateral direction of the apparatus with the bead cores B on the bead carrier plate 72 thus brought into engagement with the spacer elements 42 on the hanger bars 38 and 38'. Simultaneously when or at a suitable timing after the bead cores B on the bead carrier plate 72 are brought into engagement with the spacer elements 42 on the hanger bars 38 and 38', a control signal is supplied to the power cylinder 58 from the previously mentioned control unit and the power cylinder 58 is brought to a stop. Control signals are then further supplied from the control unit to the power cylinders 66 and 66' associated with the magnetic bead carrier plate 72 and actuate the power cylinders 66 and 66', causing the piston rods 68 and 68' of the power cylinders 66 and 66' to project upwardly. As a consequence, the support structure 64 and accordingly the bead carrier plate 72 having two filler-fitted bead cores B attached to the upper and lower half portions, respectively, thereof are driven to move upwardly along the guide rods 62 and 62' on the support posts 60 and 60' until the bead carrier plate 72 reaches the previously mentioned predetermined upper limit position above the base member 48. The arcuate upper end portions of the bead cores B on the bead carrier plate 72 are therefore raised above the spacer elements 42 on the hanger bars 38 and 38' of the hanger assembly 22. Control signals are then further supplied to the power cylinders 66 and 66' from the control unit to bring the power cylinders 66 and 66' to a stop under these conditions and, thereupon, a control signal is supplied from the control unit to the power cylinder 58 for actuating the power cylinder 58 to drive the bead transfer assembly 44 for backward movement on and along the guide rails 54 and 54' until the bead transfer assembly 44 resumes the initial position above the slidable base member 48. While the bead transfer assembly 44 is thus returning toward the initial position thereof above the base member 48, the filler-fitted bead cores B retained to the upper and lower half portions, respectively, of the magnetic bead carrier plate 72 are permitted to leave the hanger bars 38 and 38' and clear the spacer elements 42 on the hanger bars 38 and 38' of the hanger assembly 22 and are moved together with the bead transfer assembly 44. After the bead transfer assembly 44 is moved to the initial position thereof in a lateral direction of the apparatus, signals are further supplied from the control unit to the power cylinders 66 and 66' associated with the bead carrier plate 72 and actuate the power cylinders 66 and 66' to retract the piston rods 68 and 68' downwardly. The magnetic bead transfer assembly 44 is accordingly permitted to move downwardly from the predetermined upper limit position to the predetermined lower limit position thereof along the guide rods 62 and 62' on the support posts 60 and 60'. After the bead carrier plate 72 is thus moved to the predetermined lower limit position thereof above the slidable base member 48, a control signal is fed from the control unit to the fluid-operated rotary actuator unit 74 carried by the support structure 64 of the bead transfer assembly 44 and actuates the actuator unit 74 to drive the magnetic bead carrier plate 72 for rotation through 90 degrees about the axis of rotation O thereof with respect to the support structure 64. The bead carrier plate 72 which has been held in the upright position with the slot 76 located above the slot 76' as indicated by full lines in FIGS. 1 and 2 is now caused to assume a sidelong position horizontally elongated in a longitudinal direction of the apparatus as indicated by phantom lines in FIG. 1 and full lines in FIG. 3 with the initially upper half portion of the bead carrier plate 72 directed toward the bead retainer assembly 78. Under these conditions, the filler-fitted bead cores B carried on the magnetic bead carrier plate 72 have respective center axes located on the horizontal plane P which passes through the axis of rotation O of the bead carrier plate 72 and the aligned center axes Q of the first and second retainer plates 84 and 84' of the bead retainer assembly 78 as will be seen from FIG. 1. A control signal is then applied to the drive and guide unit 80 of the bead retainer assembly 78 and actuates the unit 80 to drive the bead retainer assembly 78 for movement along the overhead beam 14 from the initial rest position thereof to a predetermined operative position closer to the bead transfer assembly 44. The power cylinder 50 connected to the slidable base member 48 is then actuated by a control signal supplied from the control unit and drives the slidable base member 48 on and along the guide rails 46 and 46' so that the bead transfer assembly 44 on the base member 48 travels in a longitudinal direction of the apparatus from the initial position to a predetermined first outer lateral position in which the center axis of the bead core B carried on that half portion of the bead carrier plate 72 which has been directed toward the bead retainer assembly 78, viz., the initially upper half portion of the bead carrier plate 72 is aligned with the aligned center axes Q of the retainer plates 84 and 84'. The power cylinder 58 is then supplied with a control signal from the control unit and is actuated to drive the bead transfer assembly 44 as a whole for movement along the guide rails 54 and 54' from the above mentioned predetermined first outer lateral position thereof toward the first retainer plate 84 facing the bead carrier plate 72 of the bead transfer assembly 44. The bead transfer assembly 44 is brought to a stop in a predetermined first inner lateral position in which the bead core B carried on the initially upper half portion of the bead carrier plate 72 is held in pressing contact with the outer face of the retainer plate 84 along an outer perimeter of the retainer plate 84. By the time when the retainer plate 84 is thus contacted by the bead core B on the bead carrier plate 72, the radial slide members 86 on the retainer plate 84 are held in the radially innermost positions on the retainer plate 84. After the bead core B on the bead carrier plate 72 is brought into contact with the retainer plate 84, the drive means associated with the radial slide members 86 on the retainer plate 84 is actuated by a control signal supplied from the control unit and drives the slide members 86 to slide on the retainer plate 84 from the initial radially innermost positions to the radially outermost positions thereof. The radial slide members 86 on the retainer plate 84 are thus moved toward the inner perimeter of the bead core B on the bead carrier plate 72 and are ultimately brought into pressing contact with the inner peripheral surface of the bead core B when the slide members 86 reach the radially outermost positions on the retainer plate 84. Thereupon, the power cylinder 58 is actuated by a control signal from the control unit and drives the bead transfer assembly 44 as a whole to move along the guide rails 54 and 54' from the first inner lateral position back to the previously mentioned first outer lateral position thereof above the slidable base member 48 which is fixed with respect to the floor surface 10. The bead core B which has been attached to the initially upper half portion of the bead carrier plate 72 is now detached from the bead carrier plate 72 and is transferred to the bead retainer assembly 78. The drive and guide unit 80 of the bead retainer assembly 78 is then actuated also by a signal from the control unit and drives the bead retainer assembly 78 to move along the overhead beam 14 back to the initial rest position thereof.

When the bead retainer assembly 78 is moved back to the initial rest position thereof, the control unit supplies a control signal to the rotary actuator 88 forming part of the drive and guide unit 80 and drives the support column 82 and the first and second retainer plates 84 and 84' for rotation through 180 degrees about the vertical axis of rotation thereof. The drive and guide unit 80 of the bead retainer assembly 78 having the retainer plates 84 and 84' thus turned over is for a second time actuated to drive the bead retainer assembly 78 as a whole to travel along the overhead beam 14 to the above mentioned predetermined first operative position thereof. The power cylinder 50 is also actuated to drive the slidable base member 48 for movement along the guide rails 46 and 46' until the bead transfer assembly 44 carried thereon reaches a predetermined second inner lateral position in which the center axis of the bead core B carried on the initially lower half portion of the bead carrier plate 72 is aligned with the aligned center axes Q of the retainer plates 84 and 84' of the bead retainer assembly 78. The power cylinder 58 is then actuated to drive the bead transfer assembly 44 as a whole for movement along the guide rails 54 and 54' toward the unoccupied second retainer plate 84' facing the bead carrier plate 72 of the bead transfer assembly 44 until the bead transfer assembly 44 reaches a predetermined second inner lateral position in which the bead core B carried on the initially lower half portion of the bead carrier plate 72 is held in pressing contact with the outer face of the second retainer plate 84'. After the bead core B on the initially lower half portion of the bead carrier plate 72 is brought into contact with the second retainer plate 84', the slide members 86' on the retainer plate 84' are driven to slide from the initial radially innermost positions to the radially outermost positions thereof on the retainer plate 84. The radial slide members 86' on the second retainer plate 84' are thus moved toward the inner perimeter of the bead core B on the bead carrier plate 72 and are brought into pressing contact with the inner peripheral surface of the bead core B when the slide members 86' reach the radially outermost positions on the retainer plate 84'. Thereupon, the power cylinder 58 is actuated to drive the bead transfer assembly 44 for movement along the guide rails 54 and 54' from the second inner lateral position back to the second outer lateral position thereof, with the result that the bead core B which has been attached to the initially lower half portion of the bead carrier plate 72 is detached from the bead carrier plate 72 and is transferred to the slide members 86' on the second retainer plate 84' of the bead retainer assembly 78. The drive and guide unit 80 of the bead retainer assembly 78 is then actuated to drive the bead retainer assembly 78 for movement along the overhead beam 14 back to the initial rest position thereof.

After the unloaded bead transfer assembly 44 is returned to the second outer lateral position thereof as above described, the rotary actuator unit 74 for the magnetic bead carrier plate 72 is actuated by a control signal supplied from the control unit and drives the bead carrier plate 72 to turn through 90 degrees back to the initial upright position about the axis of rotation O thereof. A control signal is also supplied to the drive and guide unit 80 of the bead retainer assembly 78 and actuates the unit 80 to drive the bead retainer assembly 78 toward the bead setter assembly 90 along the overhead beam 14 until the bead retainer assembly 78 reaches a predetermined second operative position in which the aligned center axes Q of the first and second retainer plates 84 and 84' are aligned with the center axis R of the bead setter assembly 90. Each of the two filler-fitted bead cores B carried by the slide members 86 on the first and second retainer plates 84 and 84' of the bead retainer assembly 78 is then transferred to the bead setter assembly 90, whereupon the drive and guide unit 80 of the bead retainer assembly 78 thus unloaded is further actuated to drive the bead retainer assembly 78 for movement along the overhead beam 14 back to the initial rest position thereof. The power cylinder 58 is further actuated to drive the slidable base member 48 for movement along the guide rails 46 and 46' until the bead transfer assembly 44 is returned to the initial position in which the upper and lower slots 76 and 76' in the bead carrier plate 72 held in the upright position are for a second time aligned with the upper and lower hanger bars 38 and 38', respectively, of the hanger assembly 22. A second pair of filler-fitted bead cores B suspended from the hanger bars 38 and 38' of the hanger assembly 22 are thus transferred from the hanger assembly 22 to the bead transfer assembly 44, from the bead transfer assembly 44 to the bead retainer assembly 78 and further from the bead retainer assembly 78 to the bead setter assembly 90 in the same manners as the first pair of filler-fitted bead cores B initially suspended from the hanger bars 38 and 38' were transferred from the hanger assembly 22 to the bead setter assembly 90 through the bead transfer assembly 44 and bead retainer assembly 78 as hereinbefore described. The filler-fitted bead cores B initially loaded on the upper and lower hanger bars 38 and 38' of the closest one of the hanger assemblies 22 to the bead retainer assembly 78 are in this fashion transferred in pairs to the bead setter assembly 90 through the bead transfer assembly 44 and bead retainer assembly 78. When the upper and lower hanger bars 38 and 38' of the particular hanger assembly 22 is completely unloaded, a limit switch (not shown) carried on or engageable with, for example, the bead transfer assembly 44 is automatically caused to close. The power cylinder 50 is then actuated by a control signal from the control unit and drives the slidable base member 48 for movement on and along the guide rails 46 and 46' so that the bead transfer assembly 44 as a whole is moved along the overhead beam 14 from the predetermined initial position thereof to a predetermined position in which the upper and lower slots 76 and 76' in the bead carrier plate 72 in the upright position are aligned with the other upper and lower hanger bars 40 and 40', respectively, of the hanger assembly 22. The filler-fitted bead cores B suspended from the hanger bars 40 and 40' are now transferred from the hanger assembly 22 to the bead transfer assembly 44, from the bead transfer assembly 44 to the bead retainer assembly 78 and further from the bead retainer assembly 78 to the bead setter assembly 90 in the manners hereinbefore described. When all the filler-fitted bead cores B initially loaded on the hanger bars 38 and 38' and the hanger bars 40 and 40' of the closest one of the hanger assemblies 22 to the bead retainer assembly 78 are transferred to the bead setter assembly 90 through the bead transfer assembly 44 and bead retainer assembly 78, another signal issues from the limit switch carried on or engageable with the bead transfer assembly 44. The bead transfer assembly 44 as a whole is thereafter moved in a longitudinal direction of the apparatus to a position in which the upper and lower slots 76 and 76' in the bead carrier plate 72 in the upright position are aligned with the hanger bars 38 and 38', respectively, of the second closest one of the hanger assemblies 22 to the bead retainer assembly 78. After all the filler-fitted bead cores B suspended from these hanger bars 38 and 38' of the second hanger assembly 22 are transferred to the bead setter assembly 90 through the bead transfer assembly 44 and bead retainer assembly 78, the bead transfer assembly 44 is moved to a position in which the upper and lower slots 76 and 76' in the bead carrier plate 72 in the upright position are aligned with the hanger bars 40 and 40', respectively, of the second hanger assembly 22 and transfer the bead cores B from the hanger bars 40 and 40' to the bead setter assembly 90 through the bead retainer assembly 78. By repetition of these cycle of operation, the filler-fitted bead cores B loaded on the hanger bars 38, 38', 40 and 40' of all the hanger assemblies 22 are transferred in pairs to the bead setter assembly 90 through the bead transfer assembly 44 and bead retainer assembly 78.

What is claimed is:

1. A method of transferring annular articles from one stage to another, each of the annular articles having a ferromagnetic component element, comprising hanging the annular articles from a hanger bar having a plurality of spacer elements arranged in an array at predetermined spacings from each other, the individual annular articles suspended from the hanger bar being axially spaced apart substantially in parallel from each other respectively across said spacer elements and having respective center axes substantially aligned with each other in a predetermined direction, and transferring the annular articles from the hanger bar to a subsequent stage by repeating the steps comprising a first step of transferring one of the annular articles from the hanger bar to a magnetic article carrier member at least partly constructed of permanent magnet, the annular article transferred to the article carrier member being attached to the article carrier member with said ferromagnetic component element magnetically attracted to said permanent magnet, a second step of moving the annular article transferred to the article carrier member upwardly with respect to said hanger bar so that the particular annular article is disengaged from the two spacer elements adjacent the annular article, a third step of moving the article carrier member away from said hanger bar in said predetermined direction so that the annular article disengaged from said spacer elements is withdrawn from said hanger bar, and a fourth step of transferring the annular article from said article carrier member to said subsequent stage.

2. A method as set forth in claim 1, wherein said magnetic article carrier member is held in a first predetermined position in which the annular article transferred thereto from said hanger bar is held in a position having its center axis substantially in parallel with said predetermined direction, and wherein the steps for transferring the annular articles from said article hanger bar to said subsequent stage further comprises a fifth step of turning said article carrier member from said first predetermined position to a second predetermined position through a predetermined angle about an axis substantially parallel with said predetermined direction and thereafter the annular article is transferred from the article carrier member to said subsequent stage.

3. A method as set forth in claim 2, wherein the steps for transferring the annular articles from said hanger bar to said subsequent stage further comprises a sixth step of transferring from said article carrier member to a retainer plate having carried thereon a plurality of slide members radially movable on the retainer plate toward and away from a predetermined axis substantially parallel with said predetermined direction, said sixth step comprising (a) moving the article carrier member so that the annular article carried thereon coaxially surrounds said slide members, (b) moving the slide members away from said predetermined axis until the slide members are brought into pressing contact at their radially outer ends with the inner peripheral surface of the annular article, and (c) moving the retainer plate away from said article carrier member so that the annular article is transferred from the article carrier member to the retainer plate whereupon the annular article is transferred from the retainer plate to said subsequent stage.

4. An annular article transfer apparatus for transferring articles from one stage to another, each of the annular articles having a ferromagnetic component element, comprising at least one article carrier assembly comprising (a) at least one hanger bar operable for having a plurality of filler-fitted annular articles suspended therefrom, and (b) a plurality of spacer elements arranged in an array at predetermined spacings from each other, the annular articles suspended from said hanger bar being axially spaced apart substantially in parallel from each other respectively across said spacer elements and having respective center axes substantially aligned with each other in a predetermined direction of the apparatus, and an article transfer assembly comprising (c) a magnetic article carrier member at least partly constructed of permanent magnet and operable for having each of said annular articles transferred from said hanger bar and attached to the article carrier member with said ferromagnetic component element magnetically attracted to said permanent magnet, (d) support means for supporting said magnetic article carrier member, the support means being vertically movable with respect to said hanger bar, (e) first drive means operative to drive said article transfer assembly for movement in said predetermined direction of the apparatus for causing said article carrier member to contact one of said annular articles, and (f) second drive means operative to drive said support means for upward movement with respect to said hanger bar for permitting each of said annular articles to be disengaged from each of said spacer elements, said first drive means being further operative to drive the article transfer assembly for movement in said predetermined direction for causing the annular article contacted by the article carrier member and disengaged from the spacer elements to withdraw from the hanger bar to the article carrier member.

5. An article transfer apparatus as set forth in claim 4, wherein said support means is pivotally movable with said magnetic article carrier member about an axis substantially in parallel with said predetermined direction of the apparatus through a predetermined angle between first and second predetermined positions and wherein said article carrier member is formed with at least one slot which is sized to accommodate passage of said hanger bar therethrough in said predetermined direction of the apparatus, each of said annular articles being transferred from said hanger bar to said article carrier member with the article carrier member held in the first predetermined position thereof.

6. An article transfer apparatus as set forth in claim 5, further comprising article retainer assembly to which each of the annular articles is to be transferred from said article transfer assembly, the article retainer assembly comprising at least one retainer plate, and a plurality of slide members radially movable on the retainer plate toward and away from a predetermined axis substantially parallel with said predetermined direction of the apparatus, each of said annular articles being transferred from said article carrier member to said article retainer assembly with the article carrier member held in the second predetermined position thereof.

7. An article transfer apparatus as set forth in claim 4, wherein said article carrier assembly as a whole is movable in a direction parallel with said predetermined direction of the apparatus.

* * * * *